M. M. SCHNEIDER.
ELECTRIC WIRING FOR RAILWAY CARS.
APPLICATION FILED SEPT. 2, 1910.
1,042,608.
Patented Oct. 29, 1912.
3 SHEETS—SHEET 1.
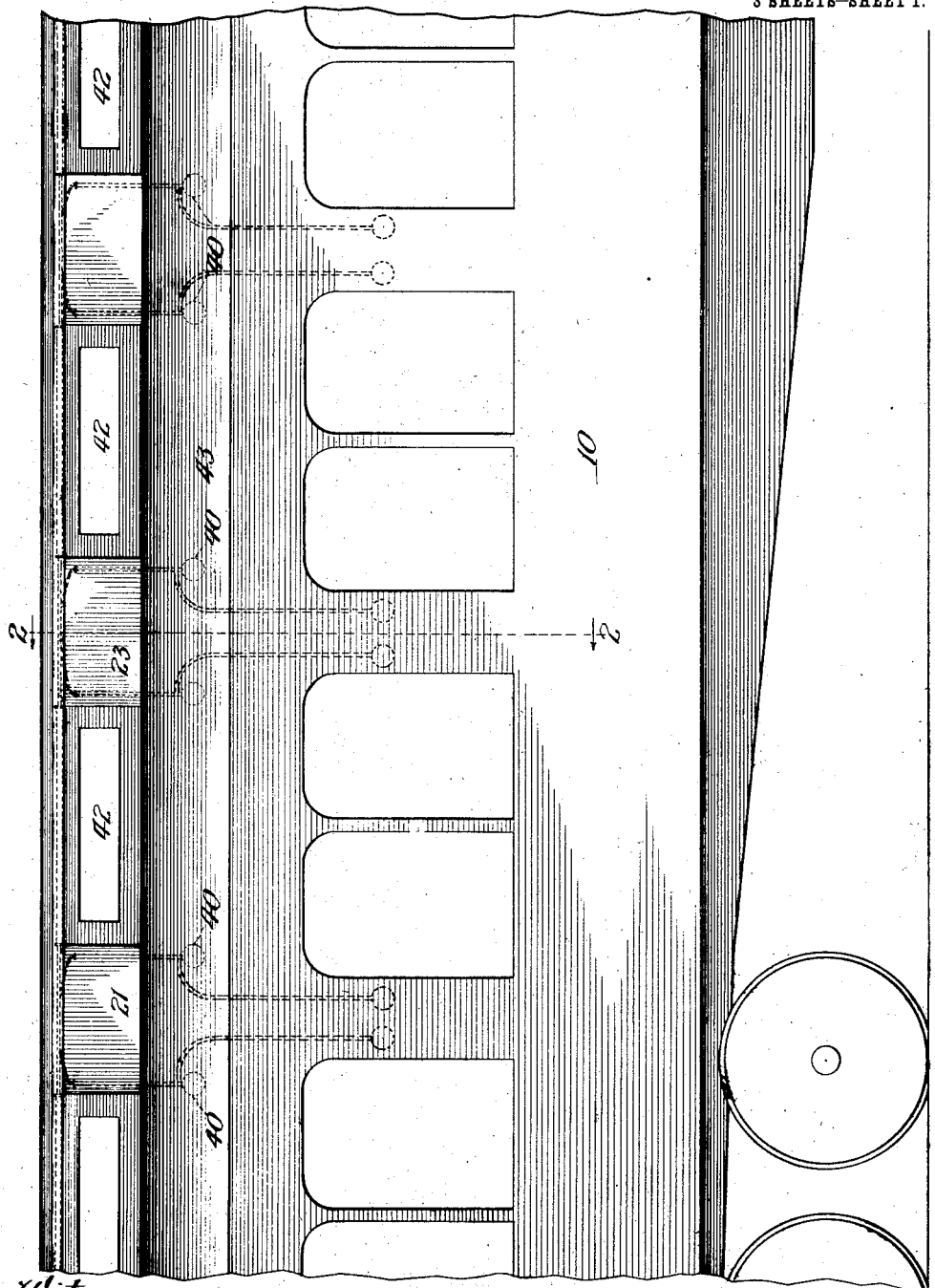

M. M. SCHNEIDER.
ELECTRIC WIRING FOR RAILWAY CARS.
APPLICATION FILED SEPT. 2, 1910.
1,042,608.
Patented Oct. 29, 1912.
3 SHEETS—SHEET 2.
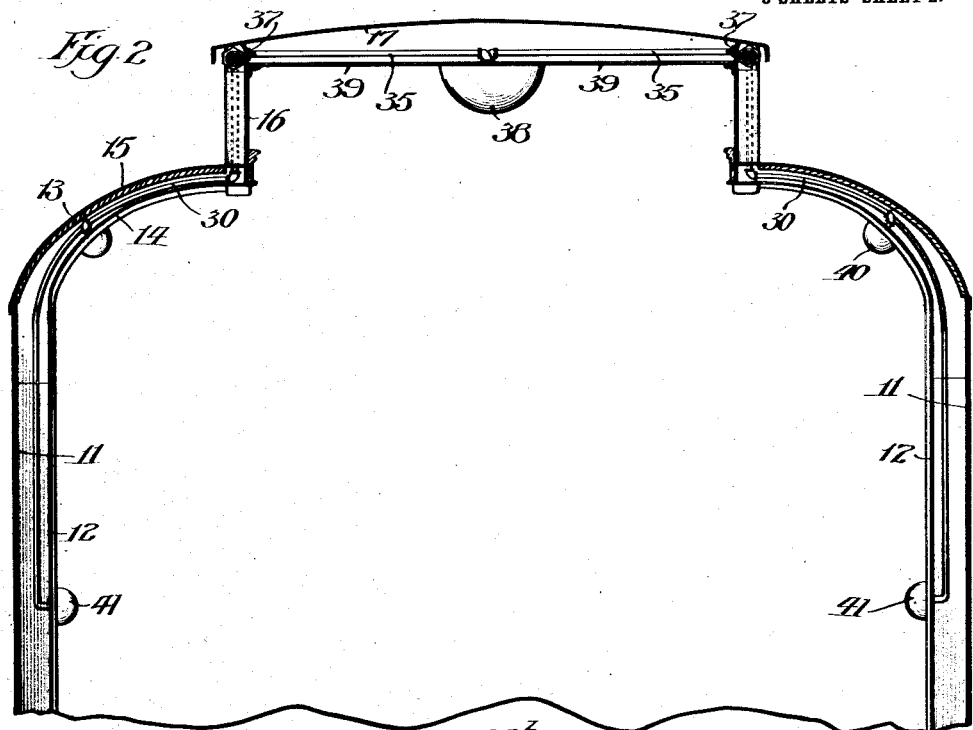
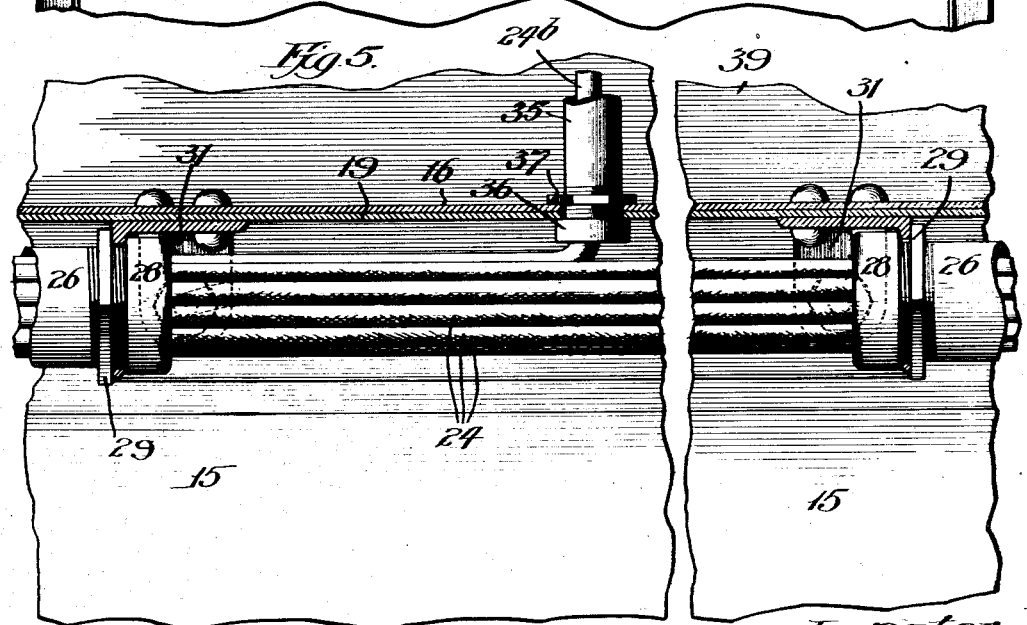
Witnesses:
Inventor
Max M. Schneider
By Attys.

M. M. SCHNEIDER.
ELECTRIC WIRING FOR RAILWAY CARS.
APPLICATION FILED SEPT. 2, 1910.
1,042,608.
Patented Oct. 29, 1912.
3 SHEETS—SHEET 3.
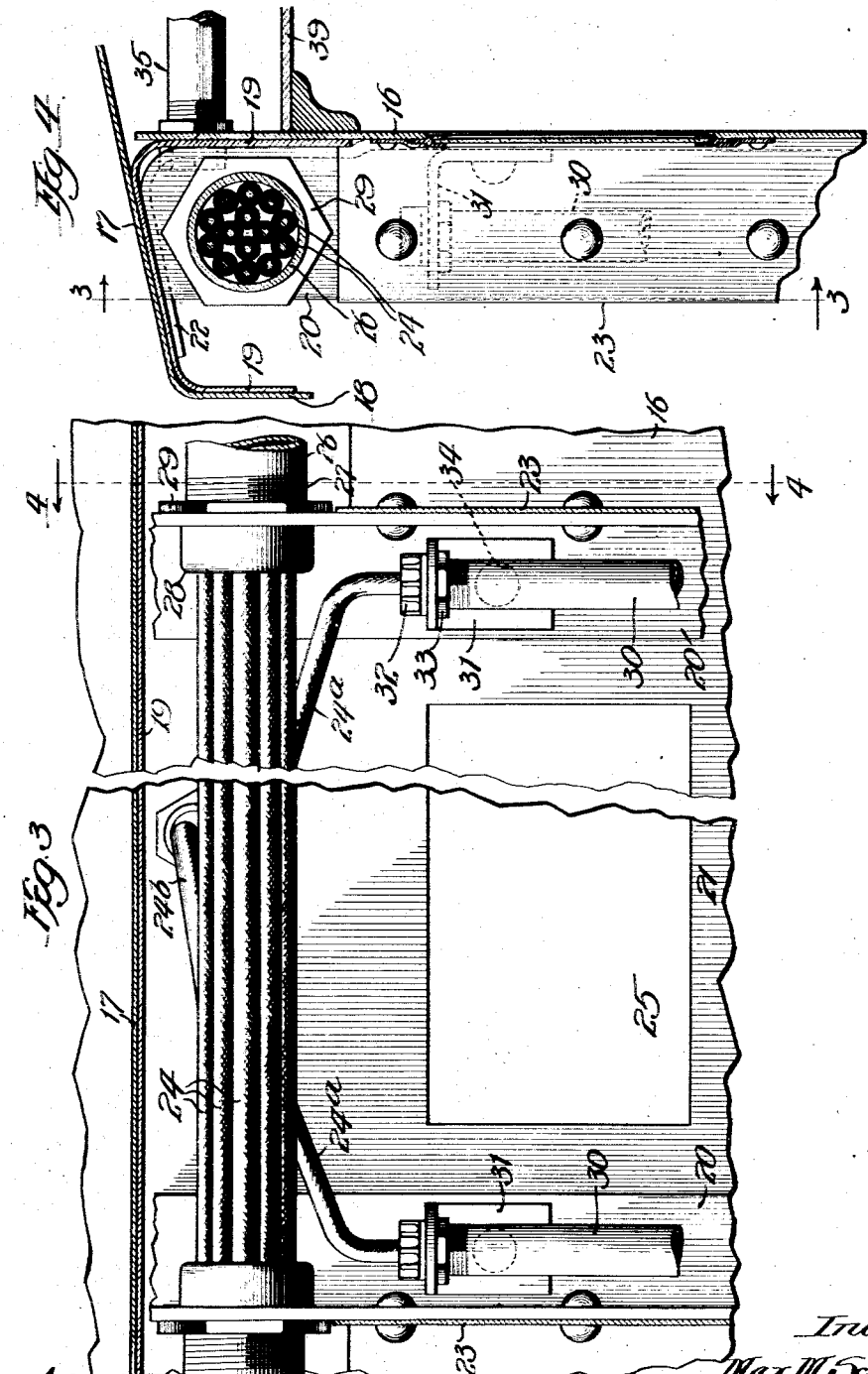

UNITED STATES PATENT OFFICE.

MAX M. SCHNEIDER, OF CHICAGO, ILLINOIS, ASSIGNOR TO THE PULLMAN COMPANY, OF CHICAGO, ILLINOIS, A CORPORATION OF ILLINOIS.

ELECTRIC WIRING FOR RAILWAY-CARS.

1,042,608.     Specification of Letters Patent.     Patented Oct. 29, 1912.

Application filed September 2, 1910. Serial No. 580,224.

*To all whom it may concern:*

Be it known that I, MAX M. SCHNEIDER, a citizen of the United States, residing at Chicago, in the county of Cook and State of Illinois, have invented certain new and useful Improvements in Electric Wiring for Railway-Cars, of which the following is a specification.

My invention relates to electric wiring for railway cars, and refers particularly to a system of wiring in which the conduits for the wires are arranged in the car in a novel manner.

Heretofore it has been customary to place conduits for the electric wiring used for lighting railway cars along the roof and to tap off branch wires as necessary in order to supply current for the individual lamps. This construction has many disadvantages, inasmuch as by placing the conduits on the roof of a car they are subjected to the action of the elements with the consequent liability of deteriorating the insulation and causing a short circuit. Moreover, it has been a matter of considerable difficulty to lead the wiring from the center conduit on the roof of the car to the individual lamps located both on the sides of the car and on the inside of the roof. In my improved construction, on the other hand, the electric mains pass along the sides of the car directly beneath the eaves. These wires are contained within pipes or other suitable conduits when passing between pier posts, but when passing through such posts, the posts themselves act as the conduits and protect the wires from the action of the elements. Special means for fastening the conduit pipes to the pier posts are provided as will be described in detail hereafter. From a position within the pier posts individual wires are led through suitable conduits to the lights which are located on the sides of the car, and similarly other pipes are provided to inclose the conductors leading to the lamps placed inside of the roof. It will be apparent to those skilled in the art that by this improved construction, I obtain several advantages. The amount of conduit which is used is considerably less than in the old construction, inasmuch as in the manner explained above no conduits are required where the main conductors pass through the pier posts; since the main conductors are contained within conduits between the pier posts, and as they pass through the pier posts the same act as conduits, it will be apparent that the electric mains are thoroughly protected from the action of the elements; the cover plates of the pier posts do not extend upwardly so that their upper edges are in contact with the roof, but a slight space is left for the purpose of aiding ventilation and to enable a workman to obtain access to the insulated wires passing through the pier posts. These and other advantages of my invention will be more apparent by reference to the accompanying drawings which show a preferred embodiment of my improvements and in which:

Figure 1 is a fragmentary side elevation of a car equipped with my system of electric wiring. Fig. 2 is a fragmentary transverse vertical section on the line 2—2 of Fig. 1. Fig. 3 is an enlarged fragmentary side elevation and partly sectional view looking toward the inside of the car, and taken on the line 3—3 of Fig. 4. Fig. 4 is a vertical transverse section on the line 4—4 of Fig. 3. Fig. 5 is an enlarged fragmentary horizontal section taken through the upper portion of one of the pier posts directly below the eaves.

The railway car 10 is provided with the outer sheathing plate 11 and the inner plate 12, these plates extending upwardly and either integral with or connected to the outer plate 13 and the inner plate 14 respectively, of the lower deck 15. The inner plate 14 of the lower deck is also continued upwardly forming the inner plate 16 of the portion of the car between the lower deck 15 and the upper deck or roof 17. As most clearly shown in Fig. 4, the roof 17 is bent downwardly at 18 to form the eaves of the car. Plate 19 is located within the roof 17 and is connected with inner plate 16 in order to form an adequate connection between the roof and the side of the car.

Riveted to the inside plate 16 are the angle irons 20, 20 between which are formed the pier posts 21. These angle irons, as most clearly shown in Fig. 4, pass upwardly and have their longitudinal flanges bent outwardly in order to occupy a position beneath the inner plate 19 of the roof, as shown at 22. Riveted to the outwardly extending flanges of these angle irons is the cover plate 23 which forms the outside of the pier post 21. It will be apparent that a space is left between the upper edge of the outer portion of the cover plate 23 and the roof of the car, this space being for the purpose of allowing access to the insulated wires 24 and also to afford communication through the pier post 21 with the ventilator space 25 which is located in the inner plate 16 which forms the inner portion of the pier post 21.

A pipe 26 extends between adjacent pier posts and is fastened to the outwardly extending flanges of the angle irons 20. Each of the pipes 26 has a threaded portion 27 on its end on which is screwed the cap member 28. This cap member abuts against one side of the outwardly extending flange of the angle iron 20, and the opposite side thereof is engaged by the nut 29 thus securing the pipe 26 securely in position.

It will be noted that the insulated wires 24 extend longitudinally of the car on each side thereof passing through pipes 26 between the pier posts and through the upper portions of the pier posts themselves. The overhanging portion 18 of the roof 17 prevents the access of the elements to these wires.

Individual wires of the series of conductors 24 may be led off as desired in order to supply individual lamps. For example, the wires 24ª are led downwardly and pass through the pipes 30 which are held in position on the brackets 31 by means of the nuts 32 and 33 engaging the ends of the pipes and between which the outwardly extending flanges of the brackets 31 are located. It will be seen that the brackets 31 are secured to the angle irons 20 by means of the rivets 34. Other wires, as for example, 24ᵇ may be led from the main series of wires 24 to the pipes 35, the ends of which are secured to the plates 16 and 19 by means of engaging the same between the caps 36 and the nuts 39. The wires 24ᵇ, after passing through the pipes 35, lead to the central lamps 38 located beneath the inner roof plate 39 of the car. As most clearly shown in Fig. 2, the wires 24ª, after passing through the pipes 30, lead to the lamps 40 which may be suitably located to supply light to the upper berths, and the lamps 41 similarly located to supply light to the lower berths.

As best shown in Fig. 1, the upper car windows 42 are located between the pier posts 21. The letter-board 43 passes longitudinally of the car outside of the cover plates 23 of the pier posts 21.

It will be evident to those skilled in the art that many changes might be made in the detailed construction of the improvements which I have described without departing from the spirit of my invention.

What I claim is:

1. In a railway car, the combination of a car frame having a roof therefor, an integral portion of said car frame being formed to afford protection for an electric conductor passing therethrough, and a conduit opening into said protecting portion of the car and extending along the exterior of said car below the eaves, substantially as described.

2. In a car, the combination of a plurality of hollow pier posts, a conduit extending between the sides of said pier posts and communicating with the inside of the same, and an electric conductor passing through said conduit and said pier posts and protected thereby, substantially as described.

3. In a railway car, the combination of a plurality of hollow pier posts, a conduit extending between the sides of adjacent pier posts and communicating with the interiors thereof, and an electric conductor passing through said pier posts and said conduit and protected thereby, substantially as described.

4. In a railway car, the combination of a plurality of hollow pier posts, a conduit extending between adjacent pier posts and communicating with the interiors thereof, said conduit being located on the exterior of the car below the eaves, and an electric conductor extending through said pier posts and said conduit and protected thereby, substantially as described.

5. In a railway car, the combination of a pier post having a cover plate therefor, said pier post having its inner side formed by the inner plate of the car, a conduit attached to said pier post and communicating with the interior of the same, said conduit being located on the exterior of the car and below the eaves, and an electric conductor passing through said conduit and said pier post and protected thereby, substantially as described.

6. In a railway car, the combination of a car frame having a roof therefor, a pier post integral with said car frame, the inner wall of said pier post being formed by the inner plate of said car, a cover plate for said pier post, said cover plate being of a height to leave a space between its upper edge and the roof of the car, and a conduit attached to said pier post and extending along the exterior of said car below the eaves, said conduit and pier post adapted to protect an electric conductor passing therethrough, substantially as described.

7. In a railway car, the combination of a car frame having a roof therefor, a pier post integral with said car frame, the inner wall of said pier post being formed by the inner plate of said car, said inner wall of the pier post having a ventilator space therein, a cover plate for said pier post, said cover plate being of a height to leave a space between its upper edge and the roof of the car, and a conduit attached to said pier post and extending along the exterior of said car below the eaves, said conduit and pier post adapted to protect an electric conductor passing therethrough, substantially as described.

MAX M. SCHNEIDER.

Witnesses:
　Ernest A. Backlin,
　F. W. Forgenfre.